United States Patent [19]

Kooiman

[11] 4,357,127

[45] Nov. 2, 1982

[54] APPARATUS FOR THE STACKING OF OBJECTS

[75] Inventor: Pieter L. Kooiman, Hendrik Ido Ambacht, Netherlands

[73] Assignee: Avedko, B.V., Dordrecht, Netherlands

[21] Appl. No.: 140,991

[22] Filed: Apr. 17, 1980

[30] Foreign Application Priority Data

Oct. 17, 1978 [NL] Netherlands ............... 7810423

[51] Int. Cl.³ ............................................. B65H 31/14
[52] U.S. Cl. ................................. 414/99; 211/49 D; 312/71
[58] Field of Search ............... 414/99; 271/219; 211/49 D; 312/61, 71; 221/271, 276, 279

[56] References Cited

U.S. PATENT DOCUMENTS

| | | | |
|---|---|---|---|
| 2,319,872 | 5/1943 | Leonard | 312/71 X |
| 2,816,808 | 12/1957 | Haines | 312/71 |
| 3,185,319 | 5/1965 | Ullmer | 414/99 X |
| 3,494,503 | 12/1967 | Kingsley | |
| 3,907,281 | 9/1975 | McKenzie | 271/219 |

FOREIGN PATENT DOCUMENTS

| | | | |
|---|---|---|---|
| 1357160 | 2/1964 | France | 211/49 D |
| 7215633 | 5/1973 | Netherlands | |
| 1239616 | 7/1971 | United Kingdom | 414/99 |

OTHER PUBLICATIONS

IBM Tech. Discl. Bulletin, vol. 2, No. 4, Dec. 1959; pp. 3 and 4.

Primary Examiner—Leslie J. Paperner
Attorney, Agent, or Firm—Andrus, Sceales, Starke & Sawall

[57] ABSTRACT

An apparatus is described for the stacking of objects, such as trays, plates, etc., in which the uppermost one of the objects in the stack is always maintained at the same height, independent of the number of objects in the stack. The novel apparatus comprises a vertically-arranged open-topped container for the stack of objects, the said container being further provided with a frame supported by a number of posts, and in which the carrier for the stack of objects is suspended from the said frame with the aid of circumferentially arranged tension springs.

The said carrier is in the form of an open-topped box the bottom of which forms the supporting surface thereof and the upper edges of the side-walls of which lie substantially in the same plane as that of the surface of the said frame, whereas the supporting surface of the said carrier is located at a considerable distance below the surface of the said frame when the carrier is in the unloaded condition.

3 Claims, 1 Drawing Figure

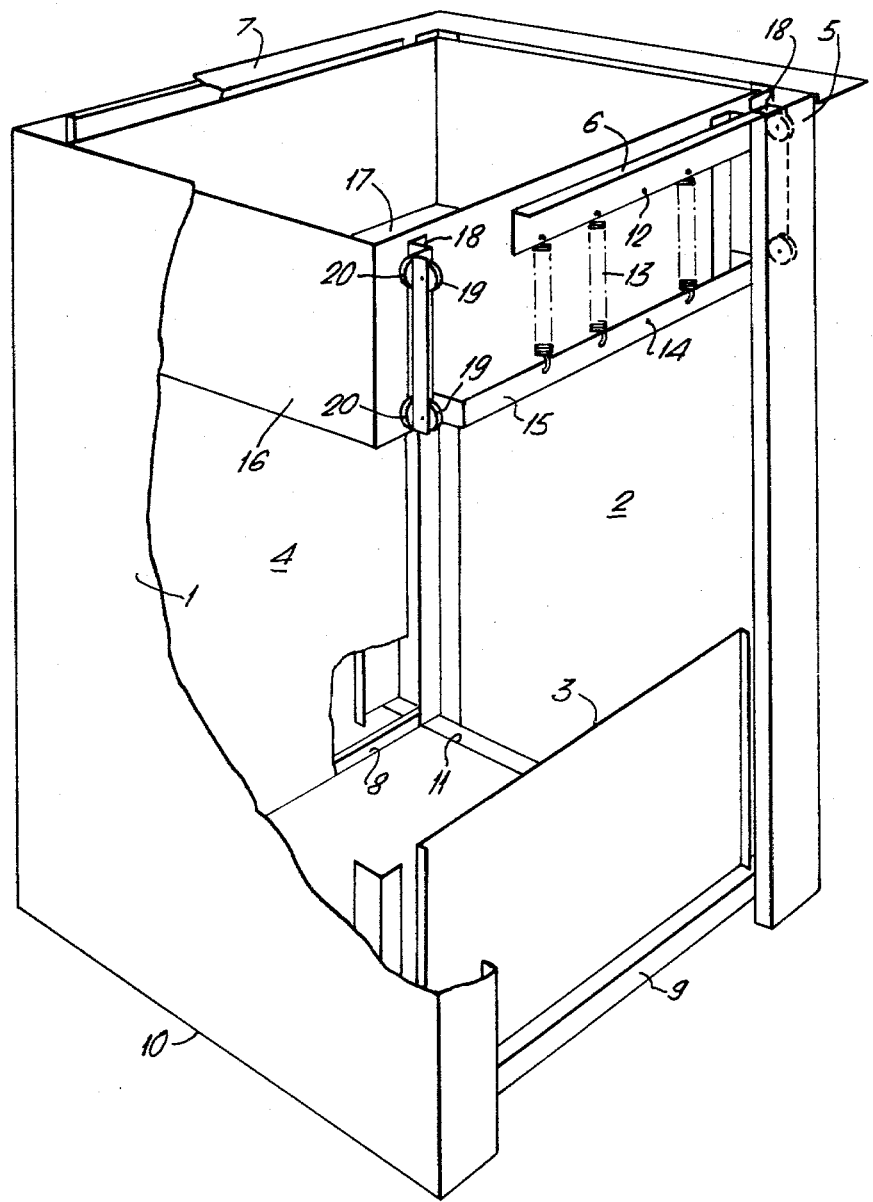

APPARATUS FOR THE STACKING OF OBJECTS

BACKGROUND OF THE INVENTION

The invention relates to apparatus for the stacking of objects, in which the uppermost one of the objects in the stack is always maintained at a certain height, in which there is provided a vertically-arranged open-topped container for the stack of objects, the said container further being provided with a frame supported by a number of posts, and in which a carrier for the stack of objects is suspended from the said frame with the aid of springs.

In practice, apparatus of this sort is known and wherein the stack supporting surface of the carrier lies substantially in the same plane as that of the frame when the carrier is in the unloaded condition. On the one hand this arrangement has the result that the stack of objects more or less extends above the frame whilst, on the other hand, limitations are imposed on the vertical distance over which the carrier is operative and the capacity of the apparatus itself, these limitations arising from the fact that the spring suspension means for the carrier extends directly below the stack supporting surface thereof. Moreover, the centre of gravity lies relatively high, thus imposing less favourable loading conditions on the guide-bearings. Furthermore it is difficult to stack one such apparatus on another of the same type when the former is in the loaded condition.

SUMMARY OF THE INVENTION

It is the object of the invention to eliminate these objectionable characteristics, and which object is achieved by arranging that according to a preferred embodiment of the invention, the carrier is in the form of an open-topped box the bottom of which forms the supporting surface thereof and the upper edges of the side walls of which, lie substantially in the same plane as the upper horizontally arranged frame of the apparatus, whereas the stack supporting surface of the carrier is located at a considerable distance below the surface of the frame, when the carrier is in the unloaded condition. The box-form of the carrier provides the further advantage that the stacked objects need not be stacked so accurately one with respect to another since the side walls of the carrier provide the means of guidance and support therefor.

Through the application of the invention, an initial stack of objects need not extend above the top of the apparatus whilst none of the space required for the movement of the carrier over its operative distance is occupied by the spring suspension means on which the carrier is hung. Through this arrangement, an increase in stacking capacity of up to approximately 35% can be obtained. Furthermore, the stack of objects acquires a lower lying centre of gravity and through which the apparatus and stack of objects in combination are more stable. In addition hereto, the stacking of one such apparatus on another of the same type is made easier.

DESCRIPTION OF THE DRAWING

The invention is now further to be described with reference to the accompanying drawing which shows a partly cut-away perspective view of one embodiment as an example.

DESCRIPTION OF THE PREFERRED EMBODIMENT

According to the drawing, the apparatus comprises an outer mantle which is shown partially cut away in order to reveal part of the interior of the apparatus. The outer mantle itself comprises two side-members 1 and 2, and front and rear members 3 and 4. The side-members 1 and 2 are each bent along the vertical outer walls to form two vertical posts 5 from each, and through which arrangement the actual stacking apparatus includes a post 5 in each corner, and opposite ones of which posts 5 are joined by horizontally arranged cross-members 6. These posts are further fixed to the flanged frame 7 which defines the horizontal periphery of the apparatus. The assembly comprising integers 1, 2, 3 and 4 is also joined in the region of the bottom of the apparatus by suitable members 8, 9, 10 and 11 and of which members 10 and 11 are the inwardly bent lower edges of the side-members 1 and 2 respectively.

A number of springs 13 are hooked onto the vertical flange of the cross-member 6 through their engagement in corresponding holes 12 in the latter. Although the drawing only shows one row of springs 13, a similar row is arranged in a like manner on the opposite side of the apparatus. In certain cases, such a row of springs could be provided on each of the sides of the apparatus.

The lower ends of the springs 13 are hooked onto a cross-beam 15, the ends of which are bent to form a shallow "U", through their engagement in corresponding holes 14 in the intermediate leg of the cross-beam 15 which lies in the same vertical plane as that of the cross-member 6 lying vertically thereabove. The outer legs of the cross-beam 15 are fixed to the carrier 16 which is parallelepiped in form and provided with an open-top and a bottom 17 constituting the stack supporting surface of the carrier 16. Members 18 having a cross-section in the form of a "W" are fixed to the carrier 16 close to the corners thereof. Each member 18 carries two pairs of wheels, and of which one pair is arranged vertically above another, and of which one wheel 18 of each pair is arranged at 90° to the other wheel 20 of the pair. These wheels 18 and 20 may be normal ball-bearings. The wheels 18 and 20 of each of the pairs are respectively constrained to roll along the adjacent inner faces of the posts 5 particular thereto, and which adjacent faces are disposed at a right-angle one to the other. It is by means of this arrangement that vertical guidance of the carrier 16 is effected in its upward and downward movements within the framework of the container constituted by the members 5 to 11 inclusive, and through which the springs 13 stretch to a greater or lesser degree dependent on the load carried on the supporting surface 17 formed by the bottom of the carrier 16. Jointly herewith, it is always possible to maintain the upper one of the objects, in a stack present in the carrier 16, at a certain delivery height.

In the illustrated embodiment of the apparatus, the walls of the carrier 16 are shown to have continuous surfaces, however in other cases for example the walls could be completely or partially perforated. Furthermore, and although the cross-section of the carrier 16 or the container is shown to be rectangular, the form could just as well be round, oval, hexagonal or octagonal, or of some other suitable form.

It is however essential to the invention that the bottom 17 of the carrier 16 or the container lies at a considerable distance below the upper surface of the flanged frame 7 whereby a number of objects accomodated in the carrier 16 will not extend above the apparatus. This makes it possible to stack one such loaded apparatus on top of another of a like type. Suitable stacking supports can be affixed to the flanged frame 7 to facilitate this manner of stacking, and which supports are arranged to co-act with the underside of the stacking apparatus lying thereabove.

The apparatus, according to the illustrated embodiment thereof, can be manufactured from sheet material in its entirety with the exception of the springs 13 and the wheels 19 and 20 and the supporting means herefor. Such sheet material should preferably be of stainless—steel with suitable means for joining the parts such as by welding them. It is also self-evident that other materials could be used.

The embodiments of the invention in which an exclusive property or privilege is claimed are defined as follows:

1. An apparatus for the stacking of objects, in which the uppermost one of the objects in the stack is always maintained at the same height, in which there is provided a vertically-arranged open-topped container provided with a frame supported by a number of posts, and in which the carrier for the stack of objects is suspended from the said frame with the aid of tension springs exterior of said carrier and positioned along at least two sides thereof and wherein the said carrier is in the form of an open-topped box, the bottom of which forms the supporting surface thereof and the upper edges of the side-walls of which lie substantially in the same plane as that of the surface of the said frame, said supporting surface of the said carrier being located at a considerable distance below the surface of the said frame when the carrier is in the unloaded condition, said distance being at least equal to the length of the tension springs in the unloaded condition, said carrier being provided at a location exterior of said carrier and proximate each end of two opposing side-walls with a vertically arranged member having a cross section of "W" form, the inner flange of said member being affixed to said sidewall, the two adjacent outer flanges each carrying at least a pair of wheels that coact with the inner sides of the posts of said container.

2. The apparatus as claimed in claim 1, wherein the walls of the carrier have a continuous closed surface.

3. The apparatus as claimed in claim 1 inclusive wherein the horizontal cross-section of the carrier is of rectangular form.

* * * * *